Figure 1:
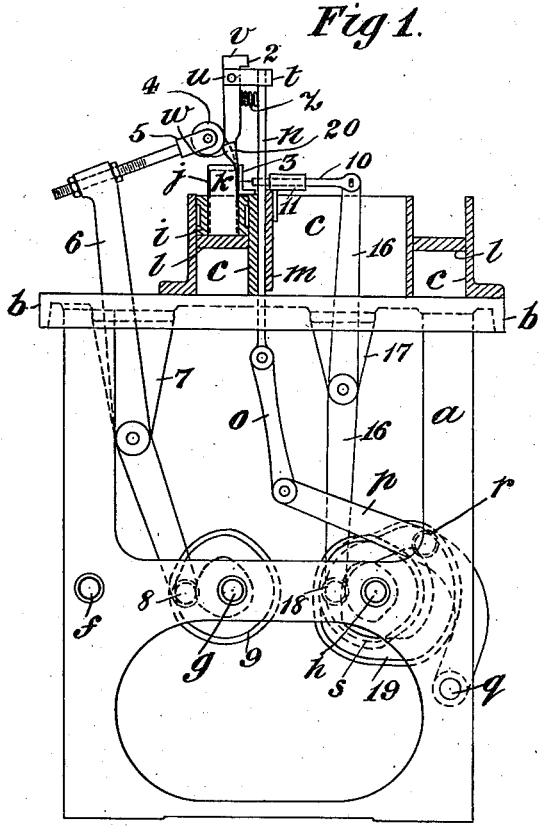

C. H. & A. DAY.
PACKAGING AND WRAPPING MACHINE.
APPLICATION FILED APR. 16, 1910.

989,574.

Patented Apr. 18, 1911.

4 SHEETS—SHEET 1.

Witnesses
G. M. Stucker
E. H. Bickerton

Inventors
Charles H. Day
Albert Day
By Meyers, Cushman & Rea
Attorneys

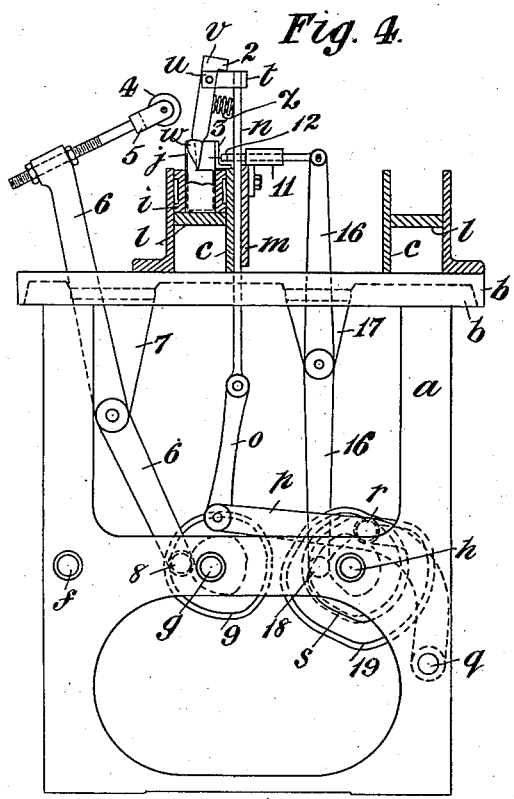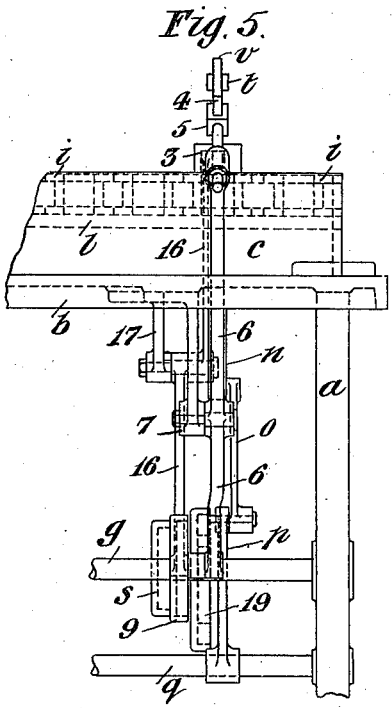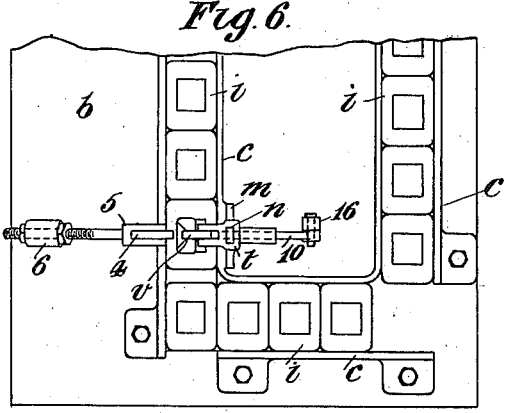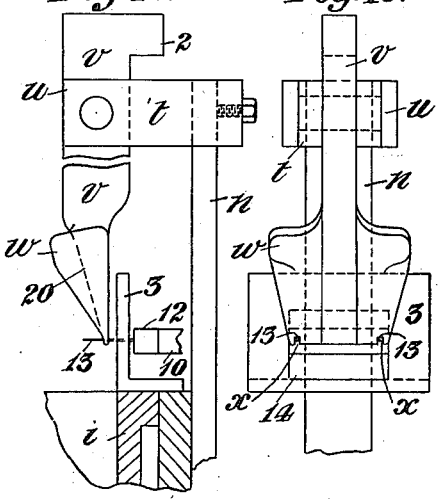

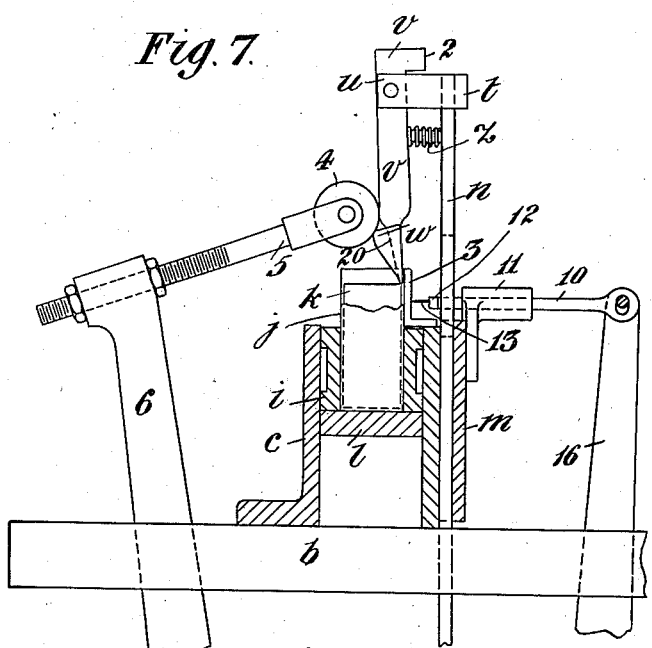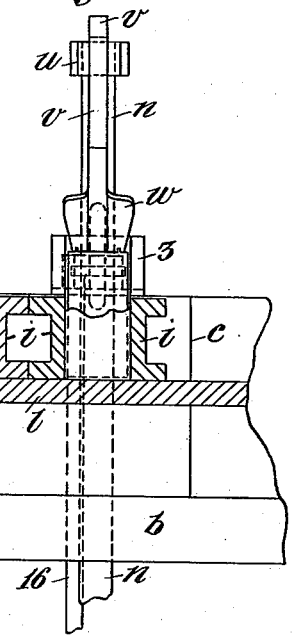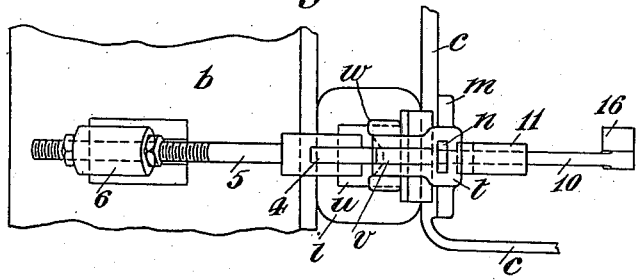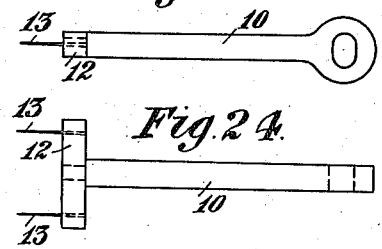

C. H. & A. DAY.
PACKAGING AND WRAPPING MACHINE.
APPLICATION FILED APR. 16, 1910.
989,574.
Patented Apr. 18, 1911.
4 SHEETS—SHEET 4.
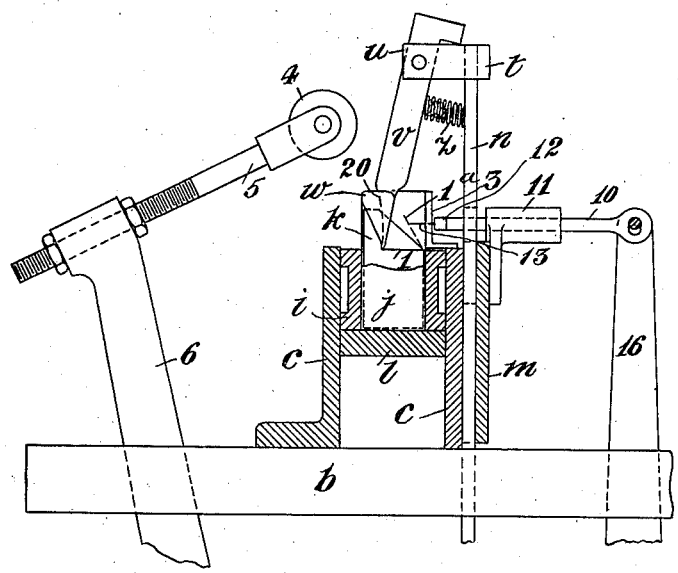
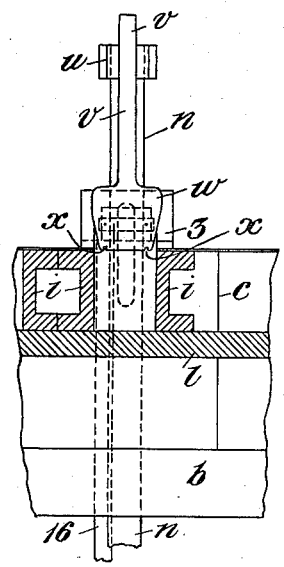
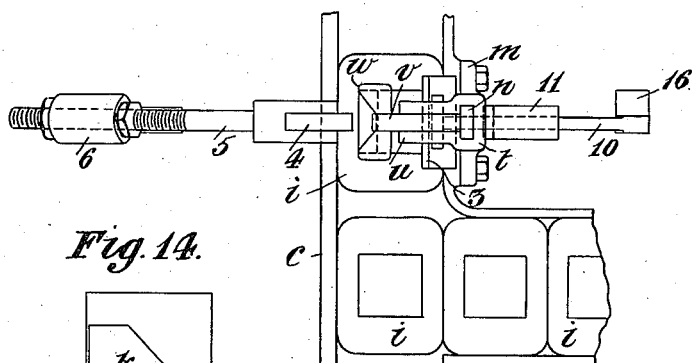
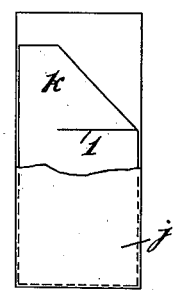
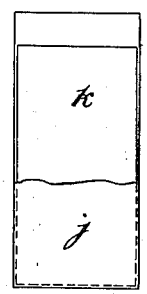
Witnesses
D. M. Stucker
C. H. Bickerton
Inventors
Charles H. Day
Albert Day
By Meyers, Cushman & Rea
Attorneys

UNITED STATES PATENT OFFICE.

CHARLES HERBERT DAY AND ALBERT DAY, OF LEEDS, ENGLAND.

PACKAGING AND WRAPPING MACHINE.

989,574.

Specification of Letters Patent.   Patented Apr. 18, 1911.

Application filed April 16, 1910.   Serial No. 555,922.

*To all whom it may concern:*

Be it known that we, CHARLES HERBERT DAY and ALBERT DAY, residing, respectively, at 22 St. John's Terrace, Belle Vue Road, Leeds, in the county of York, England, and 36 Delph lane, Leeds aforesaid, have invented new and useful Improvements in or Relating to Packaging and Wrapping Machines, of which the following is a specification.

This invention relates to improvements in packaging and wrapping machines, such as are used for packeting tea, coffee, cocoa, dry soap, powdered and other dry goods, and it is particularly applicable for machines in which bags are used provided with one or more inner lining sheets of either paper, or lead, or both, and in which the end of a single lining is, or when two linings are employed—an intermediate and an inner one—the ends are first separated from the outer sheet for closing the end of the bag, by means described in the specification accompanying George Townsend's United States application for Letters Patent dated 12th April, 1909, Serial No. 489,403, said means comprising a plate which is first inserted between the outer sheet and the lining and afterward causing the plate to be automatically moved outward for partly turning the separated portion of the lining over the contents of the bag. The partly turned over portion is afterward pressed downward by one or more flatteners. The other portions of the end of the bag are folded in by ordinary well known means as described in said application.

For many classes of lined bags the above described method may be used with advantage, but where the outer sheet of the bag or its lining is or are made of thin material then there may be a difficulty in inserting the separating plate between the outer sheet and the intermediate or other lining. To overcome this difficulty and to make the apparatus equally efficient for all classes of lined bags is the object of this invention.

In this invention the desired object is achieved by means of a wedge-shaped separator pivoted to an intermittently vertically reciprocating bar, but arranged to be pressed inward by a separately operated runner or bowl for clamping the outer bag against a fixed bracket. When the top of the said outer bag is thus clamped, and before the wedge-shaped separator has completed its downward stroke the lining is pressed inward over the contents of the bag by a number of needles or pins mounted in an intermittent carrier so as to enable the wedge-shaped carrier to freely enter between the two, and for the lining to be afterward closed over by the end of the said separator when it is moved outward by a spring on the withdrawal of the runner or bowl.

In the drawings hereunto annexed the invention is shown applied to a packaging machine such as is described in the specifications of U. S. American Letters Patents, dated 17th November 1903, No. 744,172; dated 21st March 1905, No. 785,203; dated 28th April 1908, No. 885,733, and dated 27th April 1909, No. 919,427, but it may be modified so as to be applied to other types or classes of packeting or packaging or other machines. Only such portions of a packaging machine as are necessary to illustrate the application and working of this invention are shown in the accompanying drawings.

Figure 2:
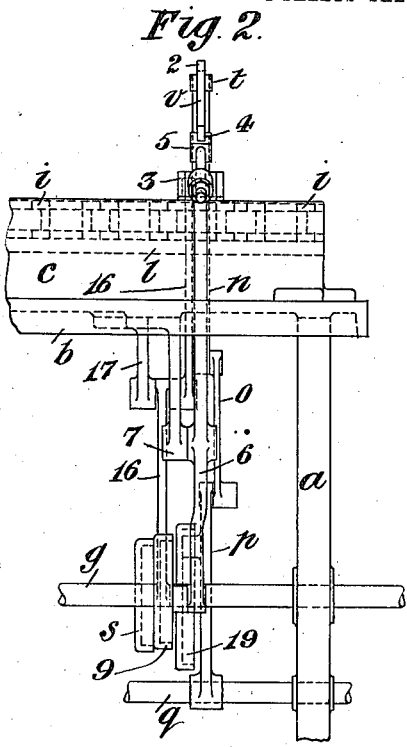
Figure 21:
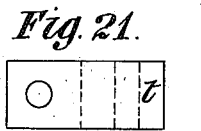
Figure 19:
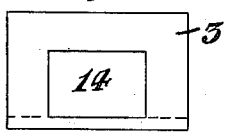
Figure 22:
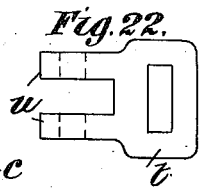
Figure 20:
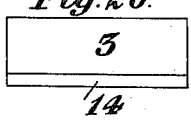
Figure 3:
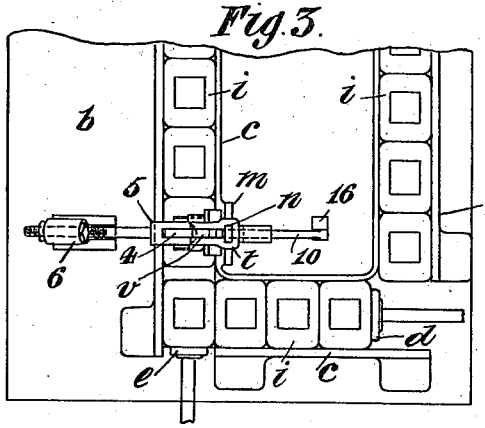

Figure 1. is an end elevation of the framework of a packaging machine with a rectangular track in which the traveling boxes work shown in section; Fig. 2. a part side elevation of the same; Fig. 3. a part plan. In these views the separating apparatus is shown in its inner position. Fig. 4. an end elevation with the rectangular track shown in section and with the lining separating apparatus in its outer and downward position; Fig. 5. a part side elevation of the same; Fig. 6 a part plan of same; Fig. 7 an enlarged part sectional elevation showing the lining separating apparatus in its inward position; Fig. 8 a part sectional elevation of the same; Fig. 9 a part plan; Fig. 10 an enlarged sectional elevation showing the separating apparatus in its downward and outward position; Fig. 11 a part sectional elevation of the same; Fig. 12 a part plan of the same; Fig. 13 an enlarged part sectional elevation of a bag showing the lining ready to be operated upon; Fig. 14 an enlarged part sectional elevation of a bag showing the inner lining paper folded in. The following details of the apparatus are drawn to an enlarged scale. Fig. 15 a part sectional elevation of the lining separator in position before being moved into the bag; Fig. 16 a front elevation of the same; Fig. 17 a side elevation of the lining separator; Fig. 18 a front elevation of the same; Fig. 19 an elevation of guide bracket; Fig. 20 a plan of same; Fig. 21 an elevation of attachment to which the lining separator is pivoted; Fig. 22 a plan of same; Fig. 23 an elevation of the needle separator; Fig. 24 a plan of same.

Like parts in all the views are marked with similar letters of reference.

$a$ is the framework of the machine, $b$ its table, $c$ the track which may be of the rectangular form as shown open at each of its ends in which are arranged to work respectively four plungers, but two only of which, $d$ and $e$ are shown in the drawings; or it may take the form of a single track, or a chain or traveling belt or band, working over pulleys, all of which forms are hereinafter termed and included in the word "track". The track may be fixed to, or form part of, or work in an opening formed in the table $b$, or it may take the form of a trough with a fixed or traveling bottom.

$f$, $g$ and $h$ are respectively the main driving shaft, the intermediate shaft, and the cam shaft of the machine. $i$ the intermittently traveling boxes which, as illustrated, are arranged to work in the rectangular track $c$ and which are propelled therein by the four plungers working at the respective corners of the track for causing them to move in the direction in which they are required to travel. The paper bag $j$ with its linings $k$ to be folded is placed in these boxes with the upper portion of the bag projecting as shown at Figs. 1 and 4. As shown at Figs. 13 and 14 it will be noted that the lining $k$ is made shorter than the bag in order to enable it to be more readily folded in the bag.

In the drawings the track $c$ is shown provided with a false bottom $l$.

All the above named parts may be of a similar construction and operate in a like manner to that described in the aforesaid prior application.

To the side of the track upon which, say, the filling, creasing and folding operations take place is fixed a bracket $m$ provided with a recess in which a vertical rod $n$ is made to intermittently reciprocate. The vertical rod is hereinafter termed "the lining carrier rod $n$". The lower end of carrier rod $n$ is connected by a link $o$ to a lever $p$ which is pivoted at its outer and lower end to the stay $q$. At a suitable distance between the two ends of the lever $p$ is mounted upon a stud fixed to the said lever a runner $r$ arranged to work in the groove of a cam 19 mounted upon the cam shaft $h$. To the upper end of the lining separator carrier rod $n$ is fixed by any suitable means a bracket $t$ provided with a bifurcated end $u$ to which the lining separator $v$ is pivoted as shown at Figs. 1 and 4. The lining separator $v$ is constructed as shown at Figs. 15 to 18, that is to say, its lower end $w$ is enlarged and made wedge-shaped as shown at Figs. 17 and 18, as well as provided on its lower edge with two or more holes or recesses $x$. The object of making this edge wedge-shaped is that it may enter between, say the bag $j$ and its innner lining $k$, and as the separator $v$ descends when the rod $n$ is caused to travel downward by its cam the inclined portion of the end $w$ will then force partially over the portion of the lining marked 1 Fig. 10 for fully separating it from the bag. The lining separator $v$ is also provided on its inner vertical surface with a projection $y$ for the reception of a spiral spring $z$ which is employed for pressing the separator $v$ outward, as shown at Figs. 4 and 10. In order to prevent the separator $v$ being moved too far outward its upper surface is provided with a projection 2 which is arranged to come in contact with the upper surface of the bracket $t$. The lining separator $v$ is retained in its inner position (Figs. 1 and 7) against a bracket 3 fixed to the top of the rectangular track $c$ by means of roller 4 mounted in a bifurcated carrier 5 which is adjustably fixed in the upper end of a lever 6 fulcrumed to a bracket 7 fixed to the underside of table $b$, as shown at Figs. 1 and 4. The roller 4 is made to work down against the incline 20 for pressing the upper end of the bag and the flat surface of the wedge-shaped end $w$ against the outer surface of bracket 3. When the wedge-shaped end $w$ and lining separator $v$ are in the position shown at Figs. 1 and 7 and pressed against bracket 3 the upper portion of the bag $j$ will be clamped and held securely between the two parts so as to permit of the hereinafter described needles 13 pressing or forcing the upper portion of inner lining $k$ inward as shown at Fig. 10. The lower end of lever 6 is provieded with a runner 8 arranged to work in the groove of cam 9 mounted upon the intermediate shaft $g$ as shown. When the upper end of the lever 6 which carries the bifurcated fixing 5 and runner 4 is moved inward by cam 9 the lining separator $v$ will be moved inward as shown at Fig. 1, but as soon as the said end of the lever and runner 4 are carried into an outward position,—as shown at Figs. 4 and 10,—the spring $z$ will then cause the lower and wedge-shaped end $w$ of the lining separator to be moved outward, and in so doing it will carry the lining across the contents at the mouth of the bag, and thus fold it inward as shown in said figures. The cam 19 is so formed that the lining separator $v$ is caused to descend for pressing the folded portion of the inner lining downward,—after being folded over,—into the contents of the bag, and the thickened upper and side portions of the separator also kink or crease the lining so as to prevent it from springing upward when the pressure is removed.

In order to first separate the lining $k$ from the bag $j$ after the wedge-shaped end $w$ of the lining separator enters the bag a horizontal reciprocating carrier 10 (Figs. 23 and 24) is provided and arranged to work in the boss of a bracket 11 which is fixed to the side of guide bracket $m$ as shown at Figs. 1, 4 and 7. The carrier 10 is provided with a cross piece 12 at its inner end having a number,—say for example, two,—pins 13 which are arranged to pass through the recesses $x$ in the lower edge of the wedge-shaped end $w$ of the lining separator $v$, and also through the opening 14 in the bracket 3. This permits of the carrier 10 working in the center of the box, and the carrier rod $n$ will require to be slotted for the passage of carrier 10. An intermittent reciprocating motion is imparted to the carrier 10 by means of a lever 16,—to which the said carrier is attached,—fulcrumed to a bracket 17 fixed to the underside of the table $b$. The lower end of lever 16 is provided with a runner 18 adapted to work in the groove of cam $s$ which is mounted upon the cam shaft $h$.

In the drawings a bag $j$ is shown with one lining $k$; but it will readily be understood two or more linings may be employed if so desired.

The action of the apparatus is as follows:—The boxes $i$ having been placed in position in the track, $c$, a lined bag $j$ with one of its ends already folded and closed is placed in one of the traveling boxes $i$ with its mouth in an upward and open position as shown in the drawings. The bag having been filled in the usual manner with the measured contents to be inclosed, the box is moved into position for the open mouth of the bag to be folded. When the bag reaches this position the lining separator $v$ will be raised to its highest position and clear of the top of the open mouthed bag. The lining separator $v$ is then moved downward by means of cam 19, lever $p$ and link $o$ until its inner end is within the bag and has been forced against the bracket 3 by roller 4 being moved inward by cam 9 and lever 6. The lower wedge-shaped end $w$ of the lining separator $v$ is enabled to first grip the bag $j$ owing to the lining $k$ being made,—as previously described,—shorter in length than said bag, simultaneously with the downward movement of the lining separator $v$, and before the latter has completed the downward stroke and finally clamped the inner side of the bag against bracket 3, the carrier 10 and needles 13 are moved inward by cam 19 and lever 16. The needles 13 are enabled to first pierce the bag $j$ owing to its being held or clamped against the bracket 3, and as the needles 13 are moved inward they carry the inner lining $k$ into the position shown in dotted line 1ª Fig. 10 so as to permit the inner and wedge-shaped end $w$ of the lining separator $v$ to pass between the inner surface of the bag and the outer surface of the lining $k$ and said pins hold the upper portion of the lining $k$ in the position shown until the lining separator $v$ has completed its downward stroke. When the said downward stroke has been completed the runner 4 will be moved by lever 6 and cam 9 to its outward position as shown at Figs. 4 and 10, and as soon as the pressure of the runner 4 is removed from the end of the lining separator $v$ the spring $z$ will expand and move the said separator into its outer position as shown at Figs. 4 and 10 and in so doing the upper end of lining $k$ will be carried horizontally across the contents of the bag. The lining separator $v$, needles 13, carrier 10 and carrier rod $n$ are afterward raised clear of the bag and returned by their respective cams and levers to their upper or outward and normal positions.

By the herein described means one portion of the lining is first separated from the upper portion of the bag and separately folded over the contents of the bag, afterward the lining $k$ and the bag $j$ on the opposite side are folded simultaneously over the fold of the lining and subsequently and successively the end lugs or opposing upstanding ends of the bag and its lining which will have been formed, are folded before the remaining upstanding portion of the bag $j$, from which the lining has been separated, is folded down into position. When it is required to open the bag it will be found that this method of folding permits the folds of the bag and its lining being opened without disturbing the first folded portion of the lining, thereby providing a tight bag from which its contents cannot escape.

What we claim is:—

1. In a packaging machine, a series of intermittently traveling boxes each box adapted to receive an open mouth lined bag projecting above the box, a fixed bracket, means for clamping the bag against said bracket, and means for separating a portion of the lining from the bag, said clamping means also infolding the separated portion of the lining and creasing the folds thereof.

2. In a packaging machine, a series of intermittently traveling boxes each box adapted to receive an open mouth lined bag, a fixed bracket, a separating device adapted to descend between the bag and its lining and be moved inwardly, relatively to the bag, for folding and creasing a portion of said lining, means for causing said separating device to clamp the bag against said bracket, and means for partly separating the lining from the bag before the descent of the separating device.

3. In a packaging machine, a series of intermittently traveling boxes, each box adapted to receive an open mouth lined bag, a separating device having a vertical and lateral movement adapted to clamp the bag against a fixed object, then descend between the bag and its lining and afterward to move laterally to infold said lining and crease the folds, and means for slightly separating the lining from the bag while the latter is clamped.

4. In a packaging machine, the combination with a track having a number of intermittently traveling boxes placed therein to receive each an open mouth lined bag, a bracket on the inner side of said track having an opening in its vertical face, a vertical reciprocating bar, a wedge-shaped separator pivoted thereto, a lever adapted to move said separator in one direction to clamp one side of the mouth of a bag against the bracket, means for moving said separator in the opposite direction when the lever is retracted to fold and crease a part of the lining, and a carrier for slightly separating the lining acted on by the separator.

5. The combination with a rectangular track having a number of intermittently traveling boxes placed therein to receive an open mouth lined bag projecting above the top of each box, and a fixed vertical face bracket provided with an opening and projecting over said track, a vertically and intermittently reciprocating rod, a wedge-shaped separator pivotally mounted thereon, means for operating said rod, a lever adapted to bear on said separator, and means for operating said lever to swing the separator outwardly with respect to said bag, and a spring for returning the separator to its initial position.

6. In a packaging machine, the combination of a plurality of traveling boxes placed therein, each box adapted to receive an open mouth lined bag placed in and projecting above the top of the box, a vertically and intermittently reciprocating rod, a bearing for said rod at the side of the track, a swinging separator pivoted on said rod and having a wedge-shaped lower end with openings in its lower edge and side creasing wings, a stop projection at the upper end of the separator, means for intermittently moving the separator inwardly, resilient means for returning the separator to its initial position, a bracket having a vertical face with an opening therein, said bracket being fixed on the top of one of the sides of the track, an intermittently reciprocating horizontal carrier and bearing for the same, said carrier having a number of projecting pins adapted to pass through the openings in said bracket and the lower edge of said separator for partially moving the lining of the bag inward after the bag has been clamped against said bracket, and means for operating the carrier.

7. The combination of a track and a number of boxes intermittently reciprocable therein, each box adapted to carry a bag having a lining, means for clamping the bag to a fixed abutment, means for partially separating the bag lining from the bag, said means comprising a horizontal carrier provided with a number of pins arranged to pierce the bag while clamped and act on said lining, and means for operating the said carrier.

8. In combination, a wedge-shaped separator, a holder for a lined bag below the same, an intermittently reciprocating rod on which said separator is hinged, a bracket on which said separator is made to bear, a lever for pressing the wedge-shaped end of the said separator against the bracket for holding the upper portion of the bag in position, a carrier provided with pins for penetrating said held bag, and slightly separating a portion of the lining therefrom, a spring for moving the lining separator inward with respect to the bag and infolding said separated portion of the lining over the contents of the bag when the lever is retracted, and means for causing the rod to descend after the lining has been slightly turned inward and before said springs act on the separator.

9. The combination of a track having a plurality of intermittently clamping boxes placed therein, means for moving said boxes, a wedge-shaped separator, a vertically intermittent reciprocating flexible rod jointed thereto, a vertical faced bracket fixed to the top of the track, means for causing the separator to clamp the bag against the bracket, means comprising a horizontally intermittently reciprocating carrier having a plurality of pins for piercing the bag and partly moving the lining over the contents of said bag, means for causing said separator to move downwardly, and means for moving the separator outwardly for closing the first fold of the lining over the contents of the bag before the remaining portions of the bag are folded in the usual way.

CHARLES HERBERT DAY.
ALBERT DAY

Witnesses:
W. FAIRBURN-HART,
WILLIAM SADLER.